(12) United States Patent
Fujishiro

(10) Patent No.: US 6,611,092 B2
(45) Date of Patent: Aug. 26, 2003

(54) FLAT FLUORESCENT LAMP HAVING UNIQUE MATING PORTION AND LIQUID CRYSTAL DISPLAY DEVICE INCORPORATING SUCH A FLAT FLUORESCENT LAMP

(75) Inventor: Fumihiko Fujishiro, Tokyo (JP)

(73) Assignee: NEC LCD Technologies, Ltd. (JP)

( * ) Notice: Subject to any disclaimer, the term of this patent is extended or adjusted under 35 U.S.C. 154(b) by 5 days.

(21) Appl. No.: 09/971,994

(22) Filed: Oct. 5, 2001

(65) Prior Publication Data

US 2002/0041144 A1 Apr. 11, 2002

(51) Int. Cl.[7] .................................................. H01J 63/04
(52) U.S. Cl. .......................... 313/493; 313/43; 313/44; 313/45; 349/70; 349/71
(58) Field of Search .............................. 313/43, 44, 45, 313/493; 349/70, 71

(56) References Cited

U.S. PATENT DOCUMENTS 4,920,298 A * 4/1990 Hinotani et al. ............ 313/493

* cited by examiner

*Primary Examiner*—Vip Patel
*Assistant Examiner*—Sharlene Leurig
(74) *Attorney, Agent, or Firm*—Hayes Soloway P.C.

(57) ABSTRACT

A flat fluorescent lamp is provided with one or more protrusions at the periphery thereof, which protrusion(s) extends outwardly beyond the edges of the two glass plates. A lamp holder receives the protrusion of the flat fluorescent lamp so as to hold the same in a manner that no edges of the two parallel glass plates touch or come into contact with the lamp holder.

14 Claims, 17 Drawing Sheets

FLAT FLUORESCENT LAMP HAVING UNIQUE MATING PORTION AND LIQUID CRYSTAL DISPLAY DEVICE INCORPORATING SUCH A FLAT FLUORESCENT LAMP

BACKGROUND OF THE INVENTION

1. Field of the Invention

The present invention relates to a flat fluorescent lamp having improvements in mating the same with a lamp holder. Further, the present invention relates to a liquid crystal display (LCD) device into which such a flat fluorescent lamp is incorporated.

2. Description of Related Art

Liquid crystal materials emit no light of their own, so that LCDs require a separate source of luminance. Fluorescent tubes are commonly used as the illumination sources in LCD backlights because they have the requisite properties of high efficiency, long life, etc. Small diameter straight fluorescent tubes are usually used as edge-light illuminators. On the other hand, single or multiple or serpentine fluorescent tubes are used as the direct backlight illuminators. However, in order to evenly illuminate the entire surface thereof, the direct backlight illuminators should sufficiently be held away from the LCDs, and accordingly, they become undesirably bulky. Further, such direct backlight illuminators itself is also bulky due to the usage of fluorescent tubes. In an effort to preclude this problem, flat or planar fluorescent lamps have proposed and they are gaining in popularity because of their high luminance and small depth sizes.

Prior to turning to the present invention, it is deemed preferable to briefly describe a conventional flat fluorescent lamp with reference to FIGS. 1–3, FIG. 1 is a partially taken away perspective view of a conventional fluorescent lamp (denoted by 10). As shown, two glass plates 12 and 14 are hermetically bonded to opposite sides of a rectangular frame 16 so as to form a discharge chamber 18. The glass plates 12 and 14 are aligned with respect to the edges or peripheries thereof when bonded to the frame 16. The peripheries of the glass plates 12 and 14 extend beyond the frame 16. By way of example, each of the glass plates 12 and 14 has a thickness of about 2 mm, and the rail of the frame 16 is about 4 mm both in thickness (height) and in width.

FIG. 2 is a cross-section of part of the flat fluorescent lamp of FIG. 1. As shown in FIG. 2, the glass plate 12 carries, on the inner surface thereof, a phosphor coating 20 that extends to in the vicinity of the upper inner corner of the chamber 18. On the other hand, the glass plate 14 is provided with, on the inner surface thereof, a plurality of pairs of plus (+) and minus (−) electrodes (only one pair 22a–22b is shown), which are covered by dielectric film (layer) 24 which is in turn covered by a light reflective film or coating (not shown). The glass plates 12 and 14 are hermetically bonded to the frame 16 using substrate frits 26 (for example). In order to secure a predetermined gap or distance, which equal to the height of the frame 10, between the glass plates 12 and 14, a plurality of spherical spacers 28 (only one is shown) are provided within the chamber 18.

It is necessary to select the materials of the glasses 12, 14, frame 16, and frits 26 so that the coefficients of linear expansion thereof are substantially identical. This is important to prevent the parts from being undesirably deformed or damaged due to thermal stress. Each of the glass plates 12 and 14 is typically made of soda-lime glass, and the frame may be made of the same material, borosilicate glass, or ceramics such as aluminium oxide or calcium oxide. As is well known, the chamber 18 is filled with an inert gas (rare gas) or an inert gas plus mercury vapor. When electric energy is applied to the lamp 10, an electric plasma arc is formed between the electrodes 22a and 22b through the mercury vapor to produce ultraviolet light rays which bombers the phosphor coating 20, causing the coating 20 to emit light in visible spectrum.

FIG. 3 is a schematic sectional view of part of a LCD device 40 wherein the flat fluorescent lamp 10 of FIG. 1 is incorporated. A parts holder or supporter 42 is provided at the corner of a rear frame 44, which holder 42 holds the parts including the flat fluorescent lamp 10 thereby determining the positions thereof. This rear frame 44 is typically made of appropriate metal and is shaped as shown, which Is applicable to other frames: intermediate frame 46 and front frame 48.

The flat fluorescent lamp 10 is placed on the bottom of the rear frame 44 such that the glass plates 12 and 14 abut onto the sidewall of the parts holder 42 at the ends thereof, and accordingly the lamp 10 is set in the prescribed position. Deposited on the flat fluorescent lamp 10 is a light diffusion plate 50 that is also set to the preset position by the holder 42. The light diffusion plate 50 is to diffuse the light emitted from the lamp 10, via which a LCD panel 52 can evenly be illuminated.

As shown in FIG. 3, the holder 42 also sets the light diffusion plate 50 in the preset position. As is well known, the LCD panel 52 comprises two transparent substrates spaced apart by a seal having a thickness of about 10 $\mu$m (for example). In the case illustrated, only the lower substrate (denoted by 53) extends such as to abut onto the projection 64 extending integrally from the holder 42. The extended portion of the substrate 53 carries thereon a plurality of bonding pads, electrical lines, etc.

As mentioned above, the lamp 10 is set in the predetermined position by abutting the edges of the two glass plates 12 and 14 onto the parts holder 42. In order to precisely position the lamp 10 within the LCD device 40, it is necessary to exactly align the edges of the two glass plates 12 and 14 in a direction normal to the main surfaces of the glass plates 12 and 14. In the case where a misalignment occurs with the edges of the glass plates 12 and 14, it is no longer expected to precisely abut both the edges of the two glass plates 12 and 14 onto the sidewall of the holder 42. The causes of potential misalignment reside in both manufacturing the glass plates and bonding them to the frame 16. Further, since the tolerances are admitted at both manufacturing and bonding of the glass plates, it is in fact extremely difficult to precisely align the glass plates. Accordingly, the conventional flat fluorescent lamp 10 suffers from the problems that the lamp 10 is typically unable to be held firmly by the holder 16 and incur play at the abutting area, which leads to the lowering of the shook resistance of the lamp 10 and reliability of the LCD device as the whole.

SUMMARY OF THE INVENTION

It is therefore an object of the present Invention to provide a flat fluorescent lamp which features improvements in coupling the same to a lamp holder, thereby to overcome the aforesaid problems inherent in the conventional flat fluorescent lamp.

Another object of the present invention is to provide a LCD device which incorporates therein a flat fluorescent lamp featuring improvements in coupling the same to a lamp holder, thereby increasing the reliability of the device in terms of shook or impact resistance and so on.

In brief, these objects are achieved by the techniques wherein a flat fluorescent lamp is provided with one or more protrusions at the periphery thereof, which protrusion(s) extends outwardly beyond the edges of the two glass plates. A lamp holder receives the protrusion of the flat fluorescent lamp so as to hold the same in a manner that no edges of the two parallel glass plates touch or come into contact with the lamp holder.

One aspect of the present invention resides in a flat fluorescent lamp comprising: a sealed chamber formed by a chamber frame and first and second glass plates, which glass plates are bonded to opposite sides of the chamber frame in alignment with the edges thereof; a phosphor coating provided on an inner surface of the first glass plate; and a plurality of electrodes provided on an inner surface of the second glass plate for inducing electric discharge within the chamber; wherein the chamber frame is provided with mating means via which the flat fluorescent lamp is held within a lamp holding frame, the mating means protruding from the chamber frame in parallel with the two glass plates beyond the edges of the two glass plates such as to leave space between the edges of the glass plates and the lamp holding frame.

Another aspect of the present invention resides in a liquid crystal display device, comprising: a liquid crystal display panel; a flat fluorescent lamp for emitting light therefrom, the flat fluorescent lamp positioned so as to illuminate the liquid crystal display panel from behind, the flat fluorescent lamp comprising a sealed chamber formed by a chamber frame and first and second glass plates, which glass plates are bonded to opposite sides of the chamber frame in alignment with the edges thereof; and a light diffusion plate provided between the flat fluorescent lamp and the liquid crystal display panel, wherein the chamber frame is provided with mating means via which the flat fluorescent lamp is held within a lamp holding frame, the mating means protruding from the chamber frame in parallel with the two glass plates beyond the edges of the two glass plates such as to leave space between the edges of the glass plates and the lamp holding frame.

BRIEF DESCRIPTION OF THE DRAWINGS

The features and advantages of the present invention will become more clearly appreciated from the following description taken in conjunction with the accompanying drawings in which like elements or portions are denoted by like reference numerals and in which.

DETAILED DESCRIPTION OF THE PREFERRED EMBODIMENTS

A principle underlying the present invention resides in the fact that a flat fluorescent lamp is provided with one or more protrusions at the periphery thereof, which protrusion(s) extends outwardly beyond the edges (peripheries) of the two glass plates. A lamp (parts) holder receives the protrusions of the flat fluorescent lamp so as to hold the same, in the case of which no edges of the two parallel glass plates touch or come into contact with the lamp holder. Accordingly, it is able to overcome the aforesaid problems inherent in the holding or positioning of the conventional flat fluorescent lamp.

Figure 1:
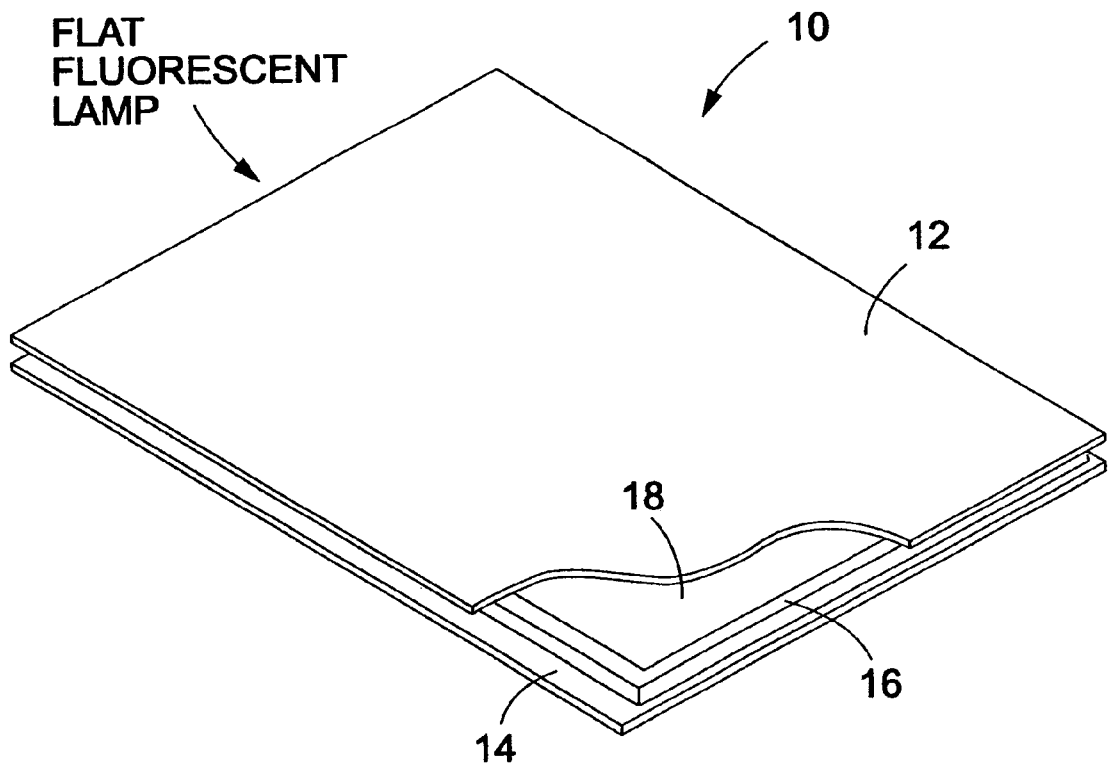
FIG. 1 is a perspective view of a conventional flat fluorescent lamp, having been referred to in the opening paragraphs.

In the following descriptions, the parts already referred to with reference to FIGS. 1–3 will be denoted by like reference numerals, and the descriptions thereof may be omitted except for becoming necessary in context.

Figure 4:
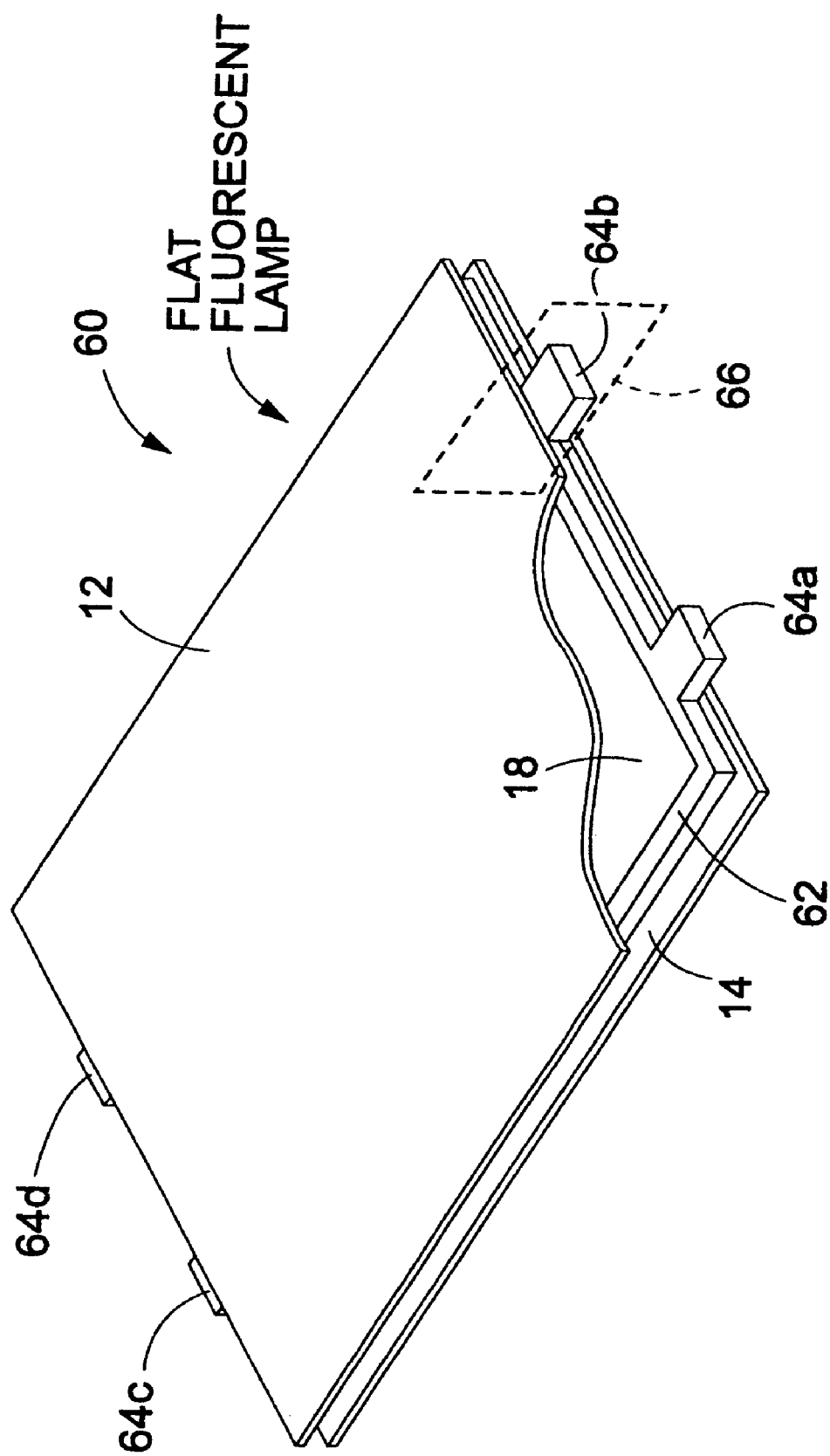
FIG. 4 is a perspective view of a flat fluorescent lamp according to a preferred embodiment of the present invention.

FIG. 4 shows in perspective a flat fluorescent lamp 60 according to a preferred embodiment of the present invention. The flat fluorescent lamp 60 comprises a substantially rectangular frame 62 that is provided with four protrusions 64a–64d extending outwardly therefrom in parallel with the glass plates 12 and 14. More specifically, the two protrusions 64a and 64b projects from one side of the frame 62 while the other two protrusions 64c and 64d projects from the opposite side thereof. The two glass plates 12 and 14 are hermitically bonded in parallel to the opposite sides of the frame 62 so as to define the discharge chamber 18 as in the conventional lamp 10 (FIG. 1). The four protrusions 64a–64d are held by a frame holder as will be referred to in the following.

Figure 5:
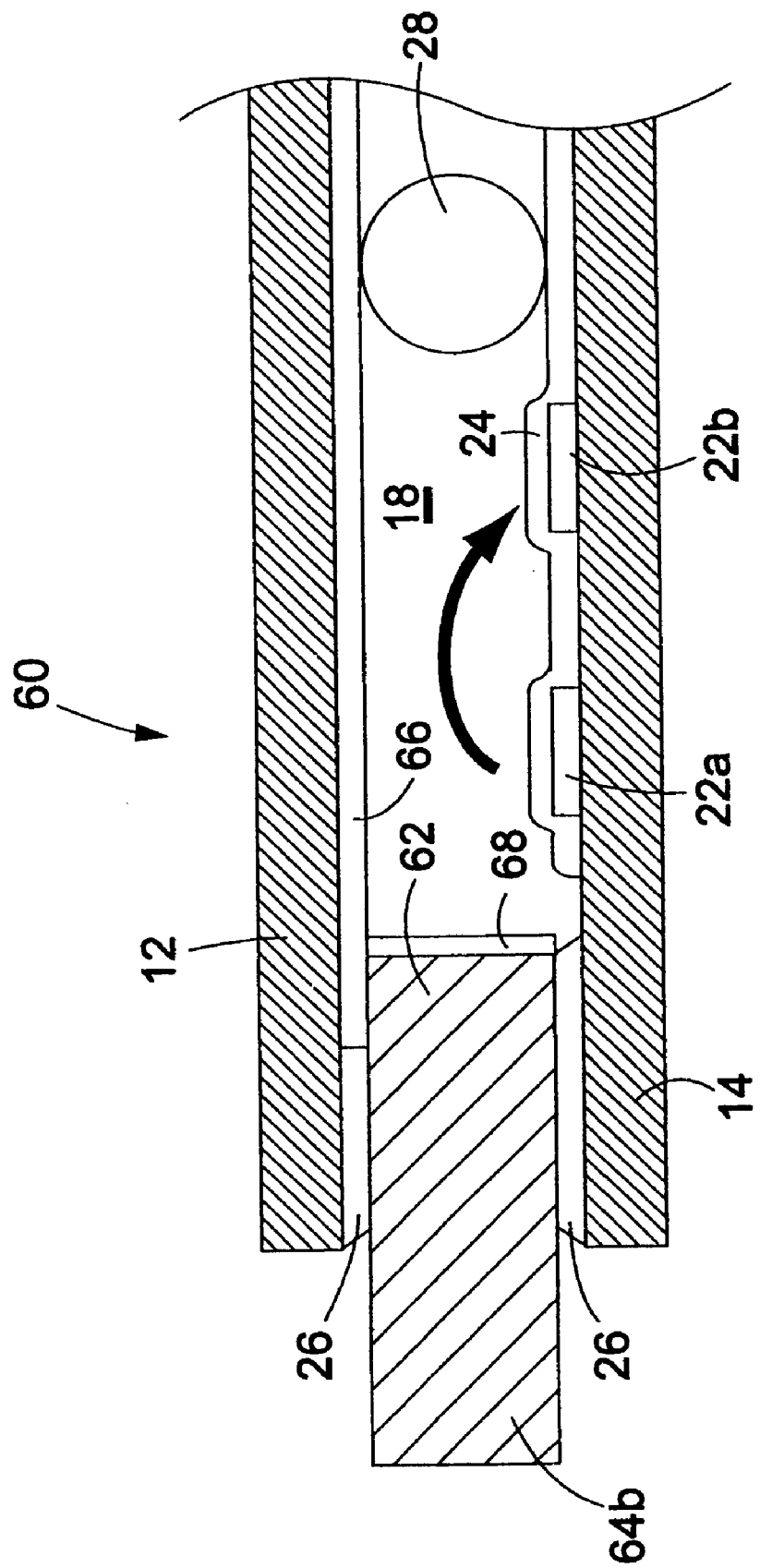
FIG. 5 a partial sectional view of the flat fluorescent lamp of FIG. 4.

FIG. 5 is a cross-sectional view of part of the flat fluorescent lamp 60 of FIG. 4, which is taken along a section plane 66 indicated by a broken line in FIG. 4. As shown in FIG. 5, the protrusion 64b projects beyond the edges of the glass plates 12 and 14 in parallel therewith, the manner of which is applicable to each of the other protrusions 64a, 64c and 64d. As in the conventional case, the two glass plates 12 and 14 are hermetically attached to the frame 62 using frits 26 (for example) so an to form the discharge chamber 18.

In the case shown in FIGS. 4 and 5, the bonding area of the glass plate 12 and the frame 62 can be made larger than that of the conventional lamp 10 (FIGS. 1 and 3), and as such, it is possible to extend a phosphor coating 66 between the glass plate 12 and the frame 62, which is able to widen the light emitting area. Further, another phosphor coating 66 may be provided on the inner wall of the frame 62, and as an alternative, it is possible to provide a light reflecting film or coating (not shown) on the inner wall of the frame 62 in place of the phosphor coating 68.

Figure 2:
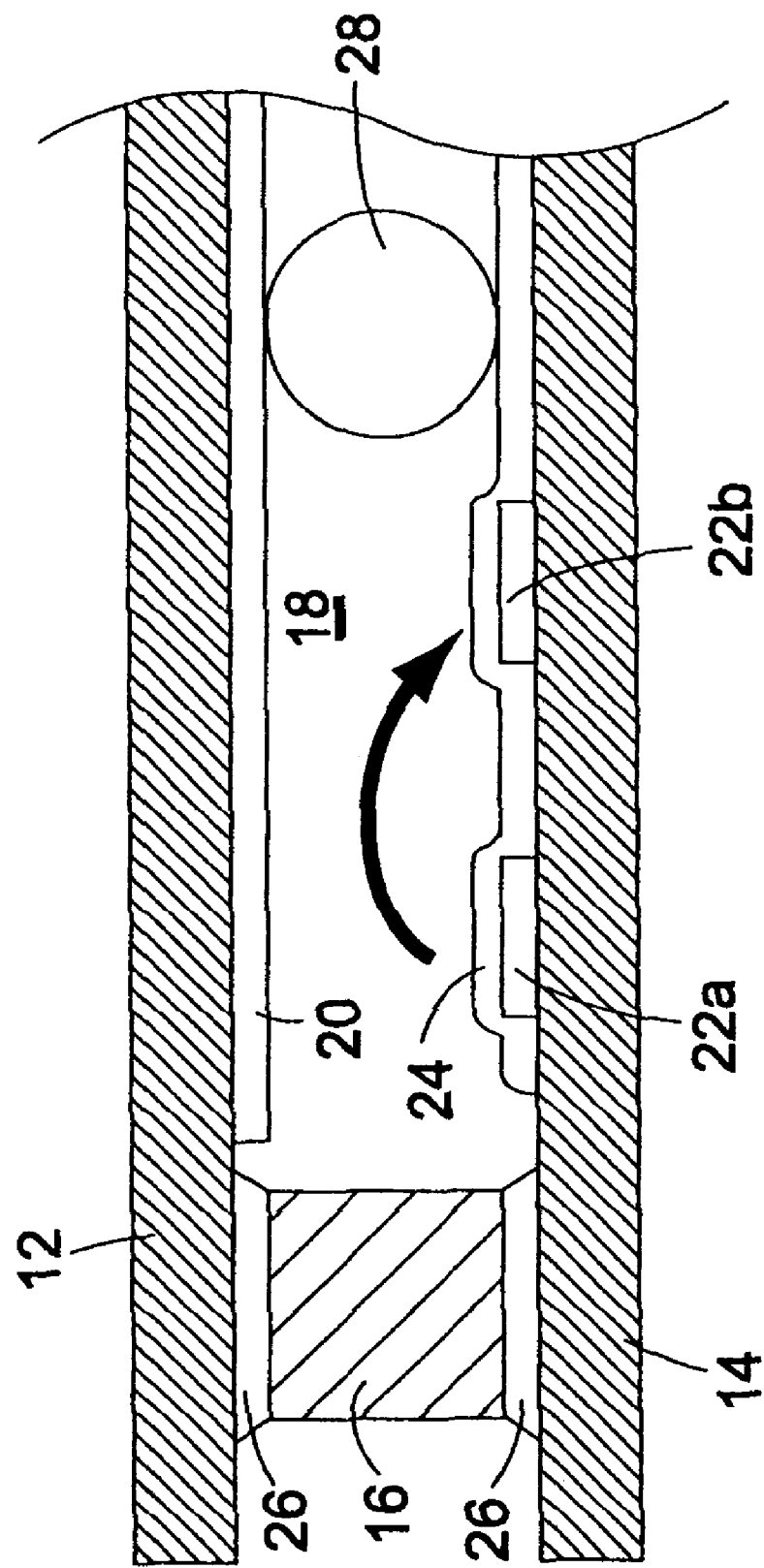
FIG. 2 is a partial sectional view of the flat fluorescent lamp of FIG. 1.
Figure 6:
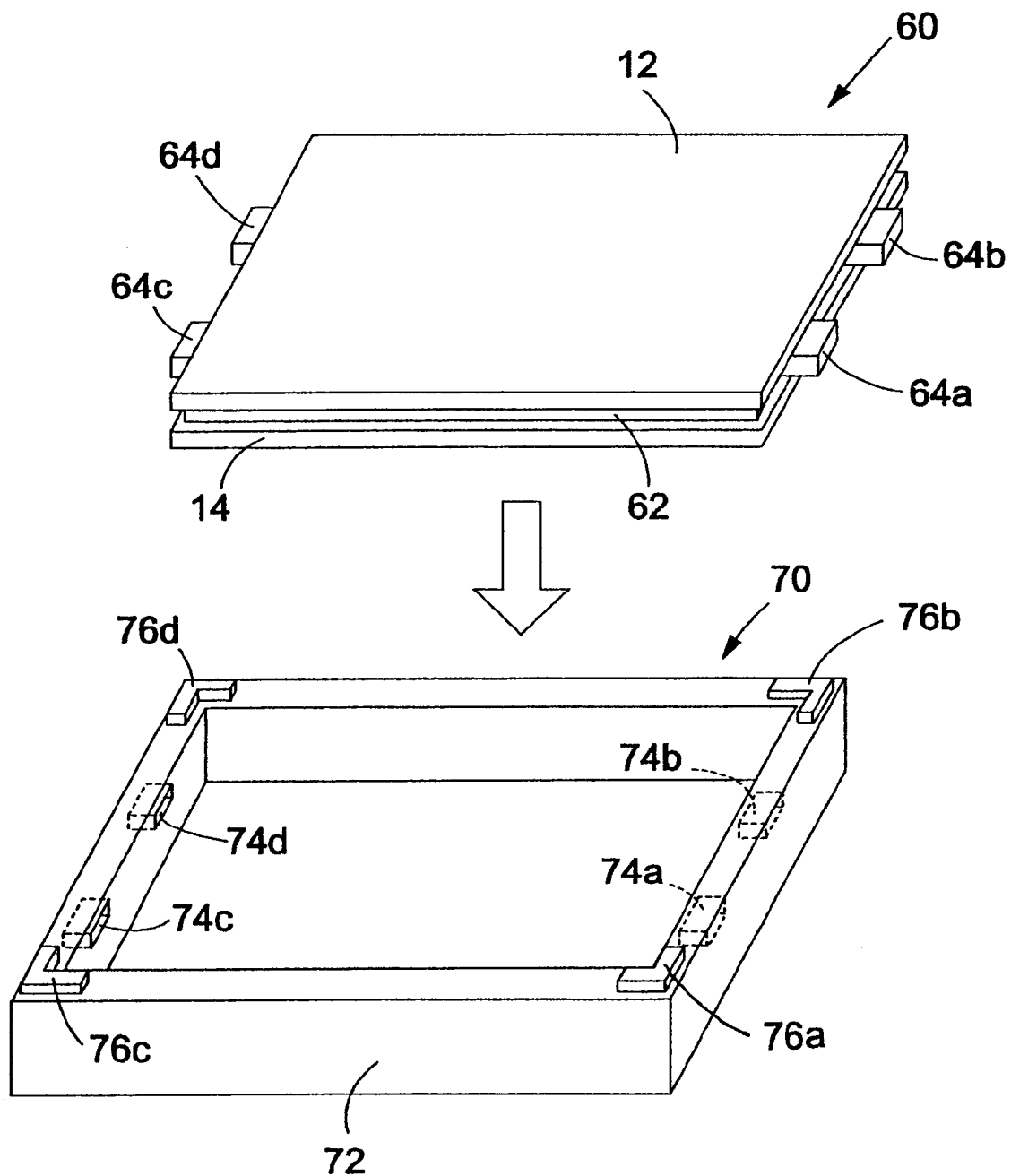
FIG. 6 is a diagram schematically showing in perspective the flat fluorescent lamp of FIG. 5 and a lamp (parts) holder.

The arrangement of the electrodes (such as 22a and 22b) is identical to that of the conventional lamp shown in FIG. 2, and hence, the further descriptions thereof will be omitted for simplifying the instant disclosure, FIG. 6 is a diagram schematically showing a rectangular holder 70 into which the flat fluorescent lamp 60 of FIG. 5 is snugly housed or accommodated. As shown in FIG. 6, the holder 70 Is comprised of a holder body 72, a plurality of recessions 74a–74d formed in the inner wall of the body 72, and L-shaped projections 76a–76d that will further be described with referents to FIG. 7. The frame body 72 is typically made of synthesis resin.

One example of installing the flat fluorescent lamp 60 into the holder 70 will be described. Initially, the projections 64a and 64b are respectively inserted into the recessions 74a and 74b. Thereafter, the holder body 72 is warped or bended so as to allow the recessions 74c and 74d to receive the remaining protrusions 64c and 64d. Thus, the lamp 60 is installed within the holder 70.

Figure 3:
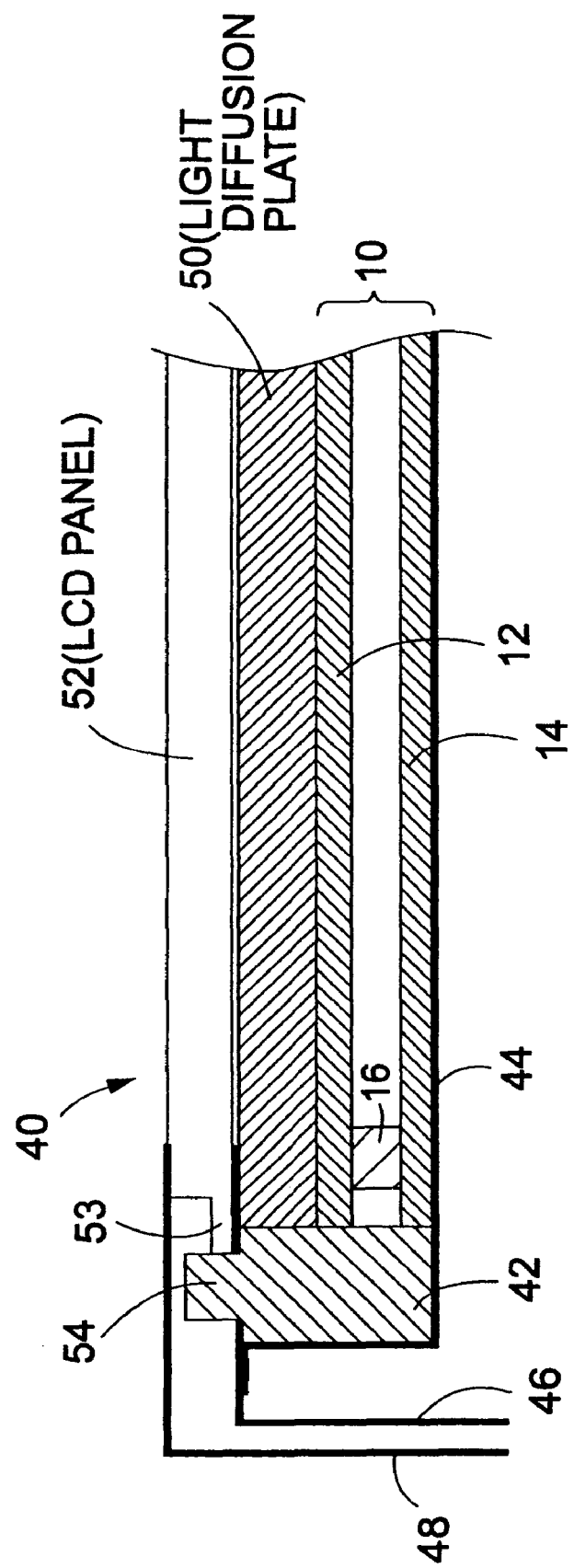
FIG. 3 is a partial sectional view of an LCD device that comprises the flat fluorescent lamp of FIG. 1.
Figure 7:
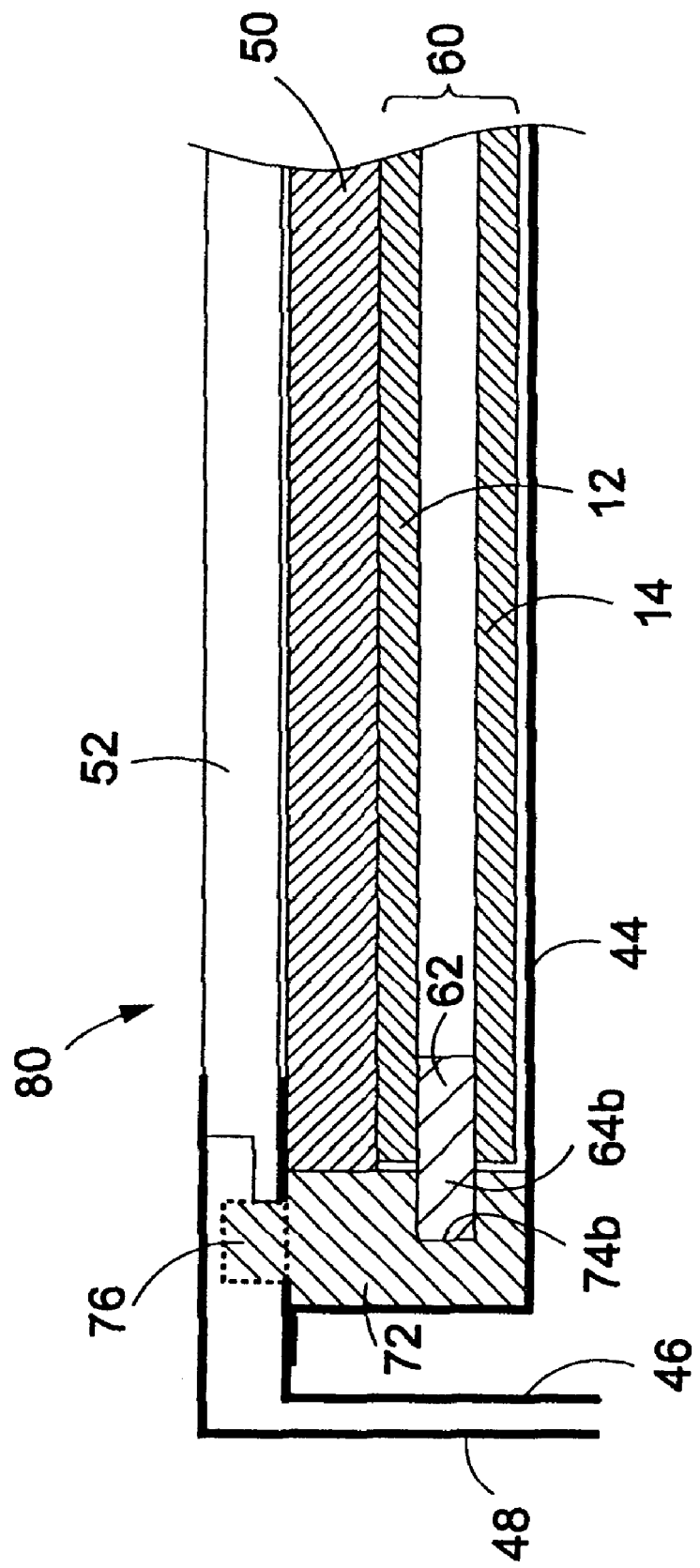
FIG. 7 is a partial sectional view of an LCD device that comprises the flat fluorescent lamp of FIG. 4.

FIG. 7 Is a cross-section of part of an LCD device (denoted by 80) into which the flat fluorescent lamp 60 shown in FIG. 4 is incorporated together with the light diffusion plate 50 and the LCD panel 52 that are respectively identical to those shown in FIG. 3. As shown in FIG. 7, the protrusion 64b is fitted into the recession 74b leaving a space between each of the edges of the glass plates 12, 14 and the sidewall of the holder body 72. In FIG. 7, the flat fluorescent lamp 60 is installed such that the bottom thereof is apart from the inner surface of the rear frame 44. However, as an alternative, the lamp 60 may be set such as to directly touch the inner surface of the rear frame 44. As shown in FIG. 6, none of the L-shaped protrusions 76a–76d is positioned above any of the recessions 74a–74d. However, for a better understanding of the LCD device of FIG. 7, one L-shaped protrusion (denoted by 76) is indicated by a broken line in FIG. 7.

Figure 8:
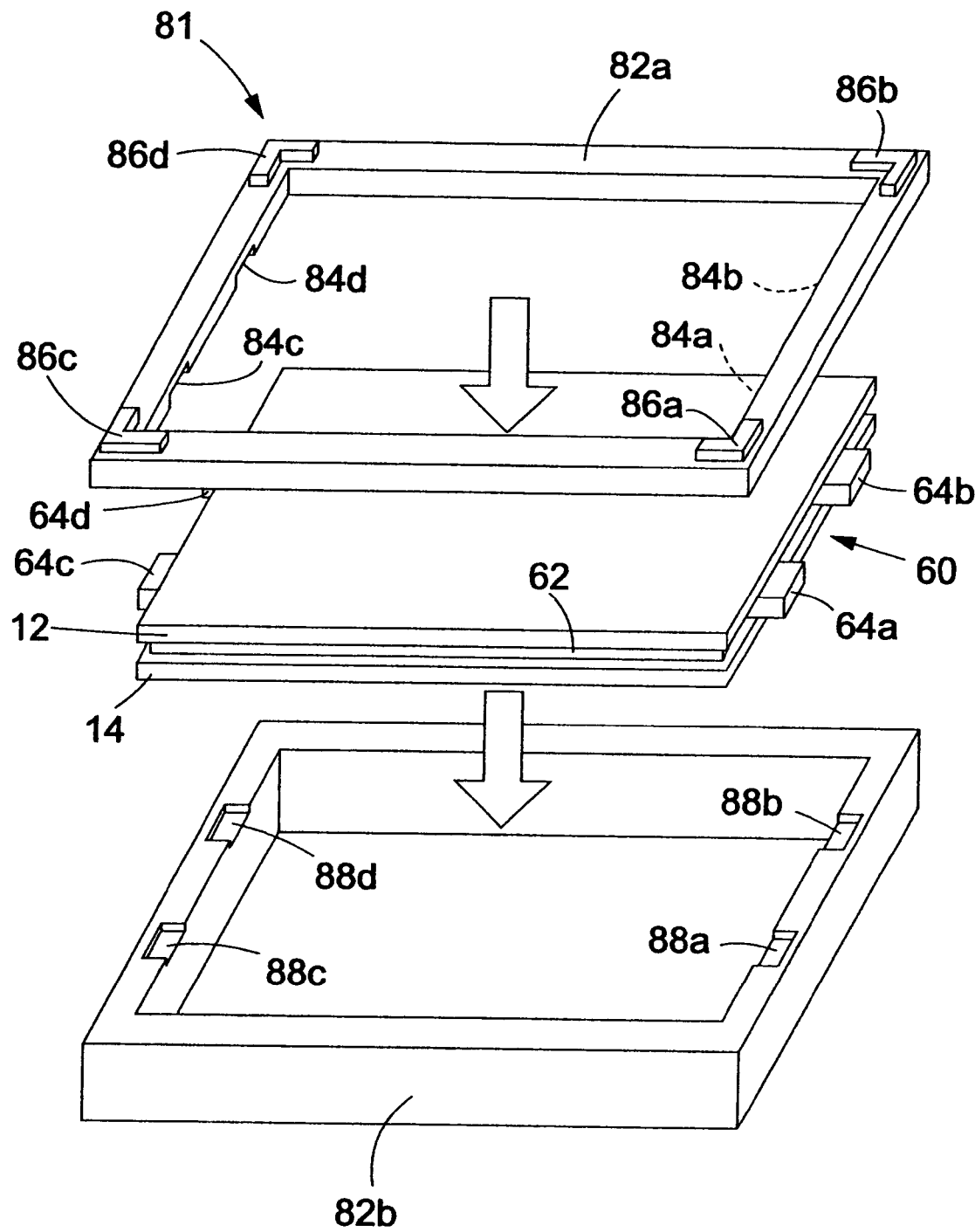
FIG. 8 is a diagram schematically showing in perspective the flat fluorescent lamp of FIG. 4 together with another type lamp (parts) holder.

FIG. 8 is a diagram schematically showing another lamp (or parts) holder 81 comprising two holder members 82a–82b and also showing the flat fluorescent lamp 60 of FIG. 4. The holder member 82a is provided with four depressions 84a–84d (depressions 84a and 84b are hidden in the drawing), and further provided with four L-shaped projections 86a–86d respectively corresponding to the counterparts 76a–76d of FIG. 6. On the other hand, the other holder member 82b has four depressions 88a–88d. When the parts shown in FIG. 8 is assembled, the depressions 84a–84d are respectively combined with the corresponding ones 88a–88d, thereby to form four recessions, corresponding to the recessions 74a–74d shown in FIG. 6, into which the protrusions 64a–64d extending from the lamp frame 62 are respectively received.

Figure 9:
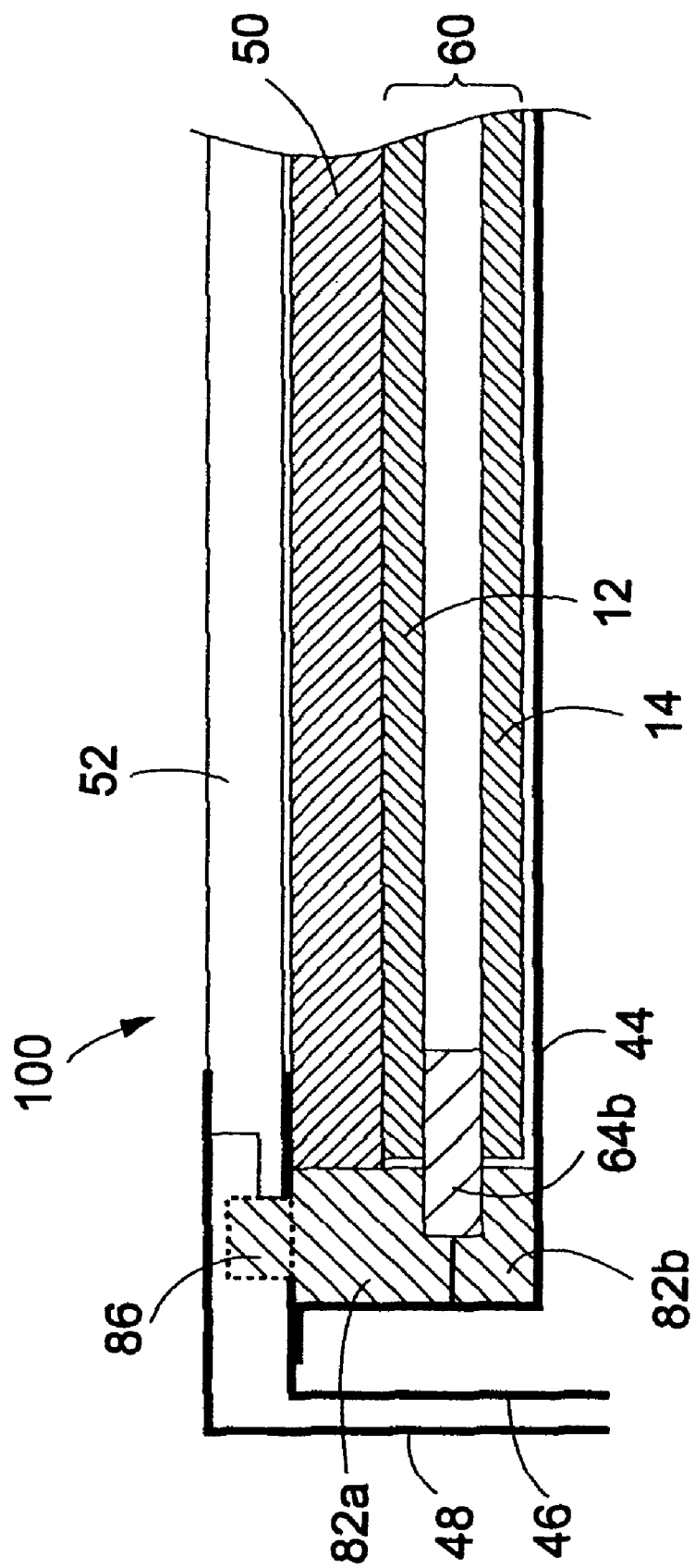
FIG. 9 is a partial sectional view of an LCD device that comprises the flat fluorescent lamp of FIG. 4 and the holder shown in FIG. 8.

FIG. 9 is a partial sectional view of part of another LCD device (denoted by 100) wherein the flat fluorescent lamp 60 of FIG. 4 is held by the combined holder members 82a and 82b of FIG. 8. The LCD device 100 also incorporates therein the light diffusion plate 50 and the LCD display 52 that respectively correspond to those shown in FIG. 3. As shown in FIG. 9, the protrusion 64b is fitted into the recession formed by the depressions of the frame members 82a and 82b, leaving a space between each of the edges of the glass plates 12, 14 and the sidewall of the holder body 72. It is understood that the other protrusions 64a and 64c–64d are also held or supported in a manner Illustrated in FIG. 9. Other than this, the parts arrangement of FIG. 9 is identical to that of FIG. 7, and as such, further descriptions thereof will be omitted for brevity.

Figure 10:
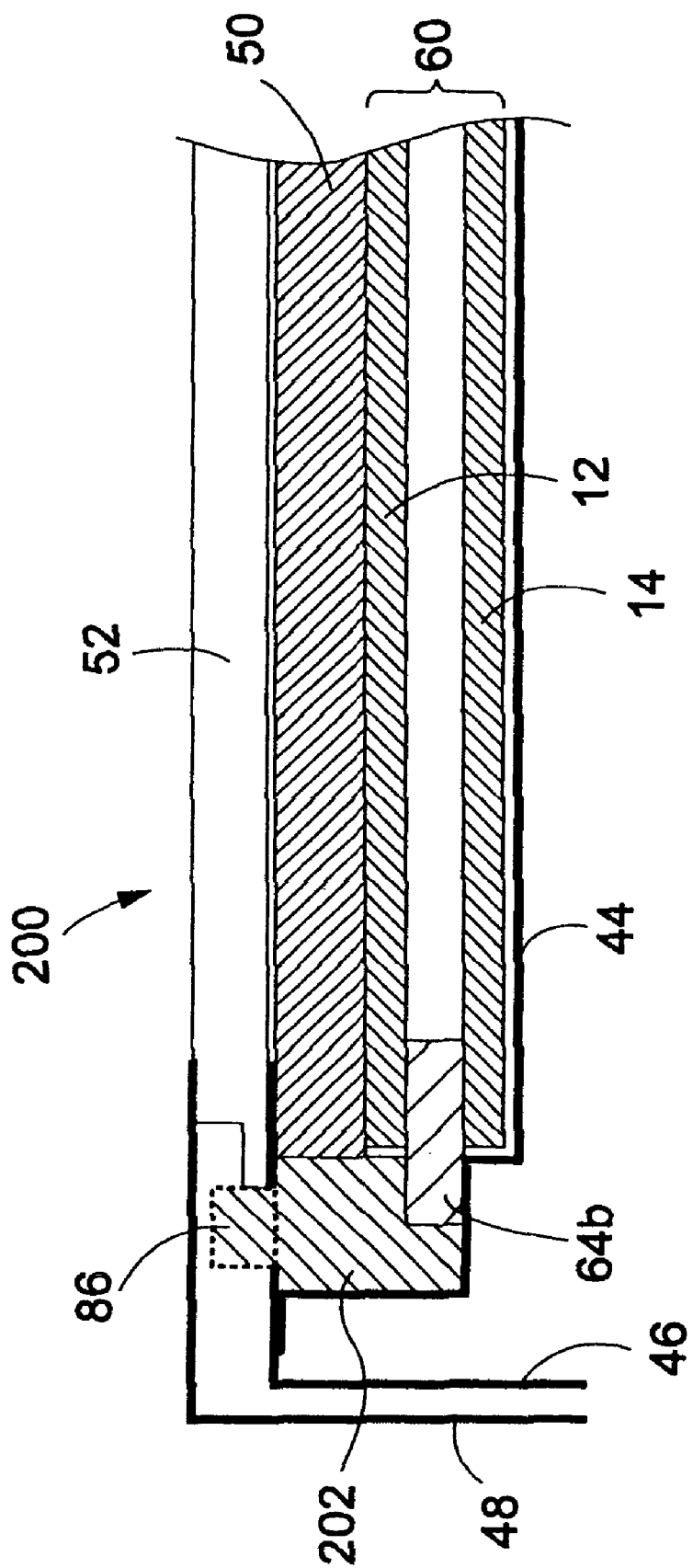
FIG. 10 is a partial sectional view of an LCD device that comprises the flat fluorescent lamp of FIG. 4 that is held in a manner different from the holding shown in FIGS. 7 and 9.

FIG. 10 is a partial sectional view of another LCD device (denoted by 200) wherein the flat fluorescent lamp 60 of FIG. 4 is held by a pars holder 202 and the rear frame 44. The parts holder 202 resembles the holder member 82a of FIG. 8, while the rear frame 44 is deformed such as to directly support the bottom of each of the parts holder 202 and the protrusion 64b. It is understood that the other protrusions 64a and 64c–64d are also held or supported In a manner illustrated in FIG. 10.

Figure 11:
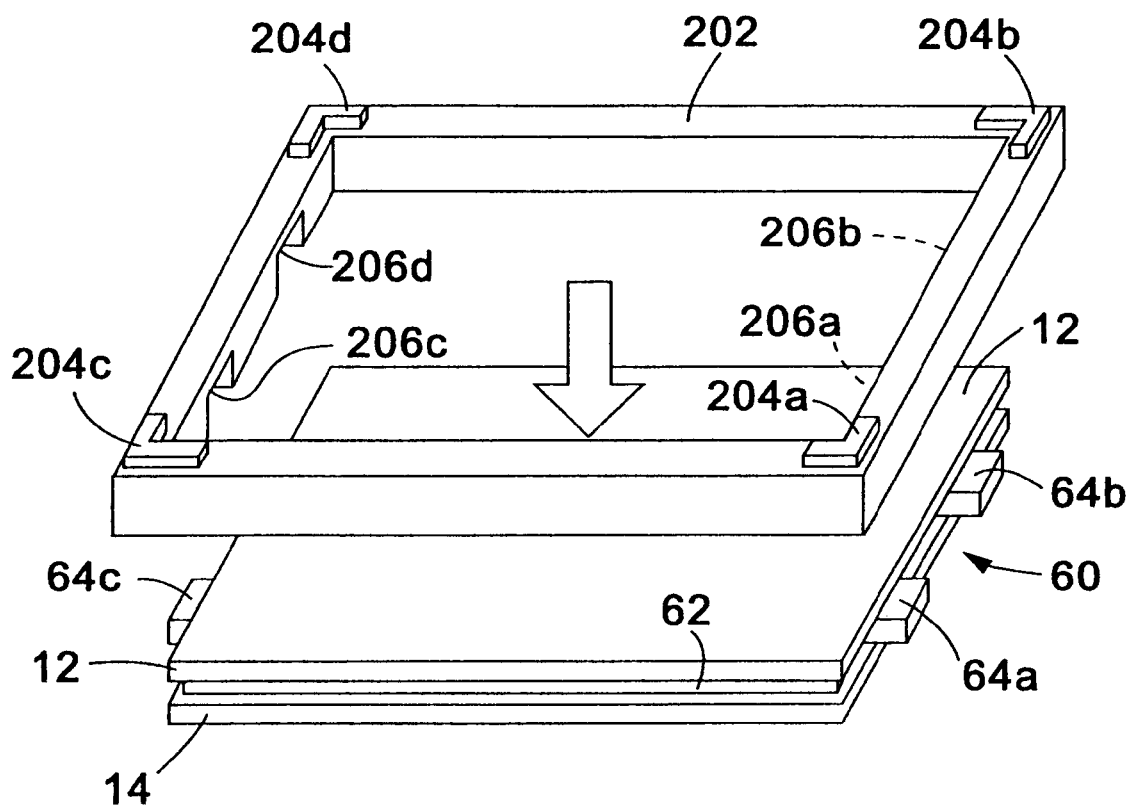
FIG. 11 is a diagram schematically showing the flat fluorescent lamp of FIG. 4 and a lamp (parts) holder shown in FIG. 10.

FIG. 11 is a diagram separately showing in perspective the holder 202 of FIG. 10 and the flat fluorescent lamp 60. As shown in FIG. 11, as in the LCD device 100 of FIG. 9, the parts holder 202 carries thereon four L-shaped protrusions 204a–204d, and is provided with recessions 206a–206d (recessions 206a–206b are hidden in the drawing). When fitting the flat fluorescent lamp 60 into the LCD device 200 (FIG. 10), the lamp 60 is first set in the LCD device 200, and thereafter, the parts holder 202 is laid on top of the lamp 60.

Figure 12A:
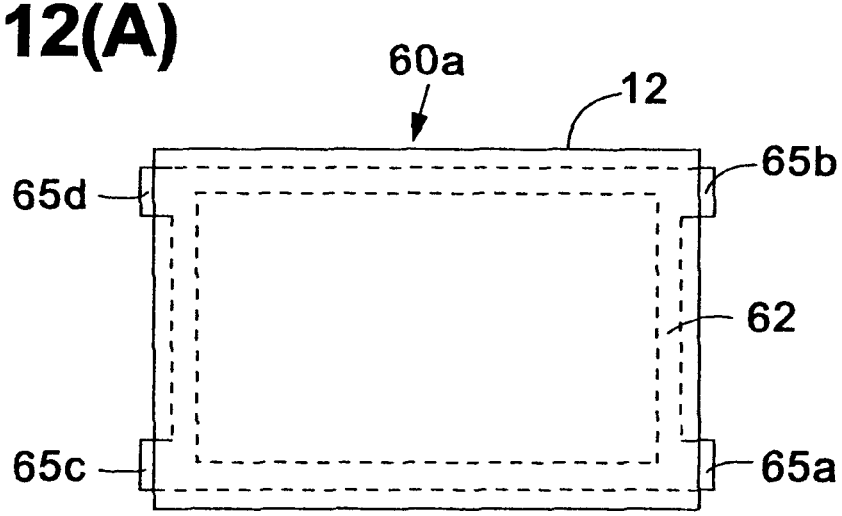
FIGS. 12(A)–12(C) are each showing another flat fluorescent lamp which is provided with a variation of the mating portions of the flat fluorescent lamp of FIG. 4.

FIG. 12(A) shows a first modification of the protrusions 64a–64d of FIG. 4. As shown in FIG. 12(A), the flat fluorescent lamp (denoted by 60a) is provided with four protrusions 65a–65d each of which protrudes at the portion including the corner of the frame 62. Other than this, the lamp 60a is identical to the lamp 60 of FIG. 4.

Figure 12B:
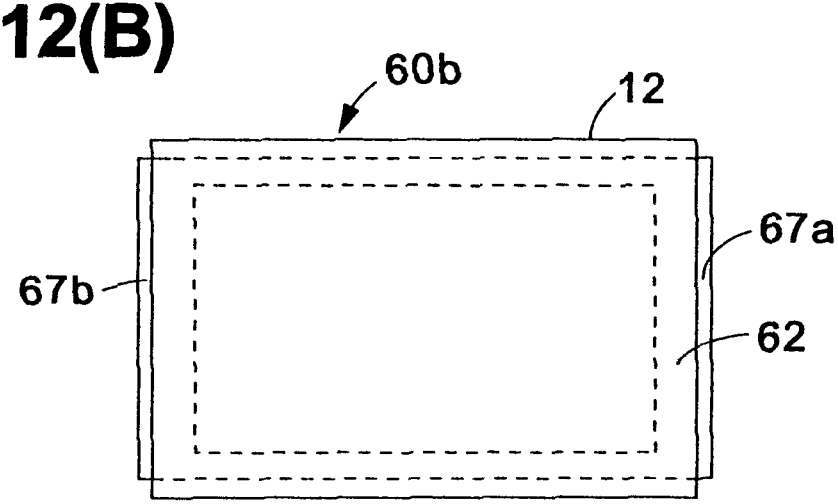

FIG. 12(B) shows another modification of the protrusions 64a–64d of FIG. 4. As shown in FIG. 12(B), the flat fluorescent lamp (denoted by 60b) is provided with two protrusions 67a and 67b protruding from whole opposite sides of the frame 62. Other than this, the lamp 60b is identical to the lamp 60 of FIG. 4.

Figure 12C:
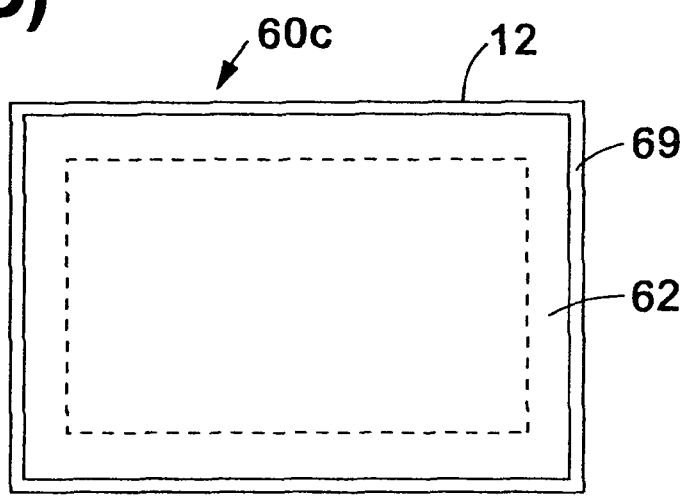

FIG. 12(C) shows still another modification of the protrusions 64a–64d of FIG. 4. As shown in FIG. 12(C), the flat fluorescent lamp (denoted by 60c) is provided with a protrusion 69 protruding from the whole circumference of the frame 62. Other than this, the lamp 60c is identical to the lamp 60 of FIG. 4.

Figure 13:
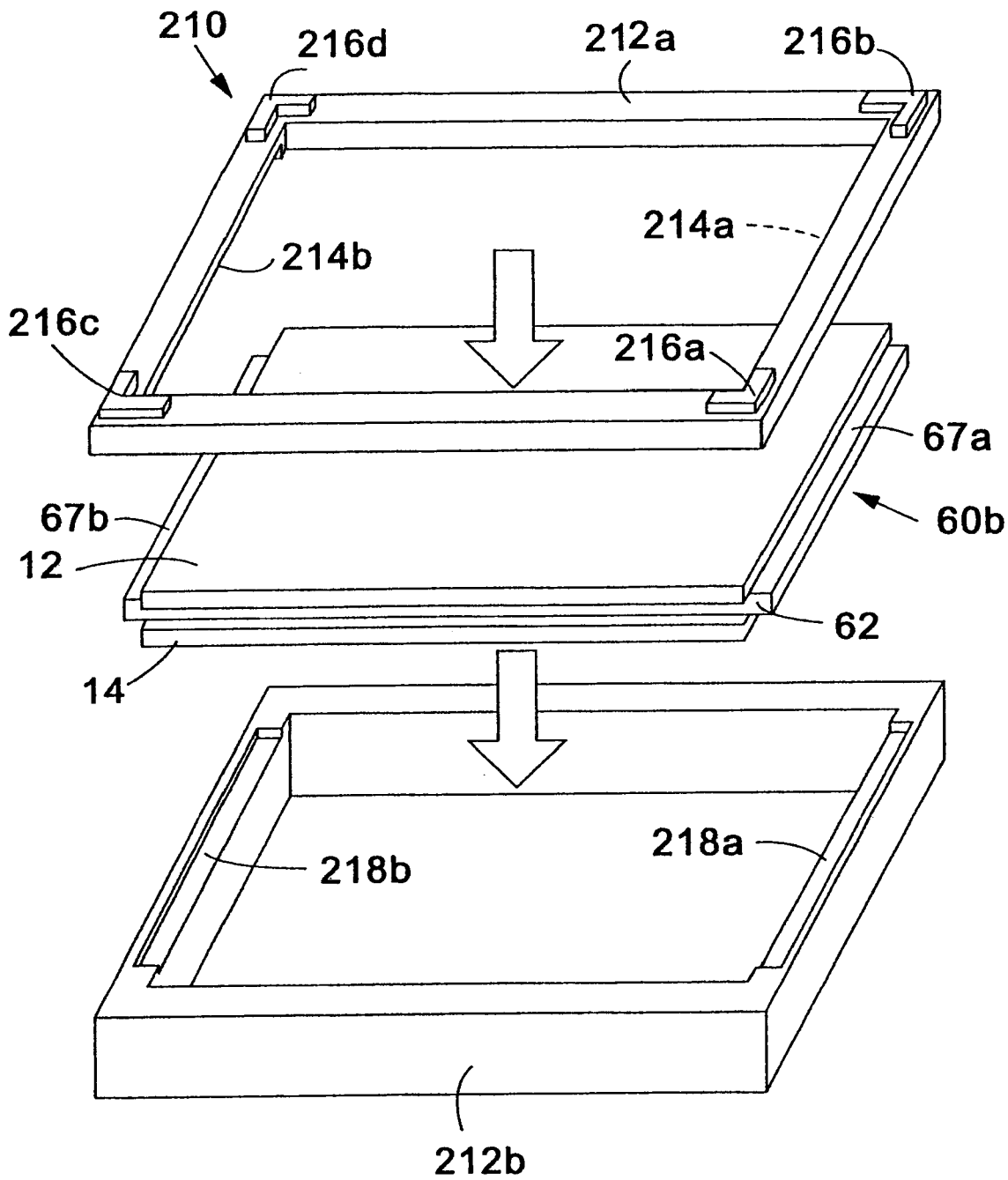
FIG. 13 is a diagram schematically showing the flat fluorescent lamp of FIG. 12(B) and a lamp (parts) holder.

FIG. 13 is a diagram schematically showing a lamp (or parts) holder 210 comprising two holder members 212a–212b and also showing the flat fluorescent lamp 60b of FIG. 12(B). The structure of FIG. 13 corresponds to that of FIG. 8. The holder member 212a is provided with two grooves 214a–214b (groove 214a is hidden in the drawing), and further provided with four L-shaped projections 218a–218d respectively corresponding to the counterparts 76a–76d of FIG. 6. On the other hand, the other holder member 212b has two grooves 218a–218b. When the parts shown in FIG. 13 is assembled, the grooves 214a–214b are respectively combined with the corresponding ones 218a–218b, thereby to form two long recessions, into which the protrusions 67a–67b protruding from the lamp frame 62 are respectively received.

Figure 14:
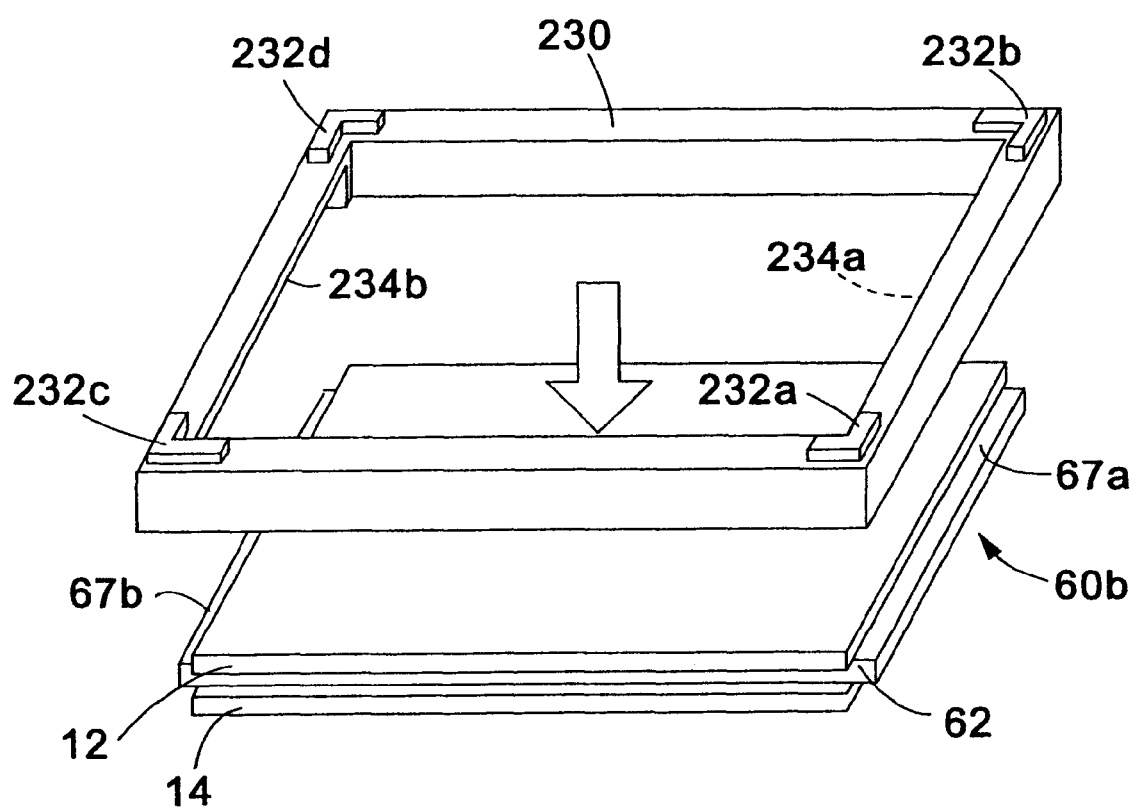
FIG. 14 is a diagram schematically showing the flat fluorescent lamp of FIG. 12(B) and another lamp (parts) holder.

FIG. 14 is a diagram separately showing in perspective a lamp holder 230 and the flat fluorescent lamp 60b of FIG. 12(B). The holder 230 corresponds to the holder 202 of FIG. 11, and the holder 230 and the lamp 60b are incorporated into an LCD device such as denoted by 200 (FIG. 10) wherein the rear frame 44 is deformed such as to directly support the bottom of each of the holder 230 and the protrusion 67a (and 67b).

Figure 15:
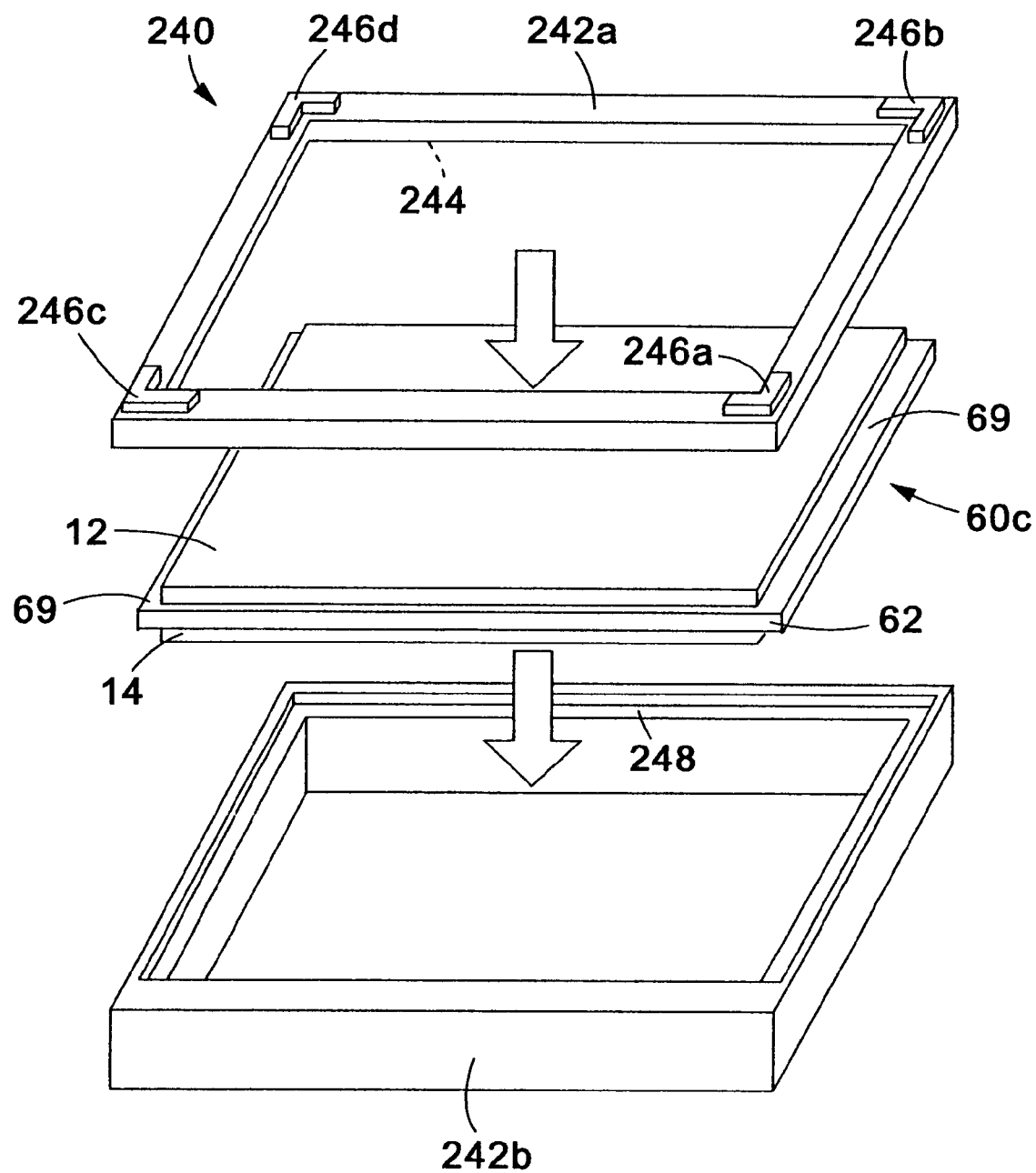
FIG. 15 is a diagram schematically showing the flat fluorescent lamp of FIG. 12(C) and a lamp (parts) holder.

FIG. 15 is a diagram schematically showing another lamp holder 240 comprising two holder members 242a–242b and also showing the flat fluorescent lamp 60c of FIG. 12(C). The structure of FIG. 15 corresponds to that of FIG. 8 or 13. The holder member 242a is provided with a circumferentially provided groove 244 which is however hidden in the drawing, and further provided with four L-shaped projections 246a–246d respectively corresponding to the counterparts 76a–76d of FIG. 6. On the other hand, the other holder member 242b has a circumferentially provided groove 248. When the parts shown in FIG. 15 are assembled, the grooves 244 and 248 are combined thereby forming one circumferentially provided recessions, into which the protrusion 69 projecting from the whole circumference of the frame 62 is fitted.

Figure 16:
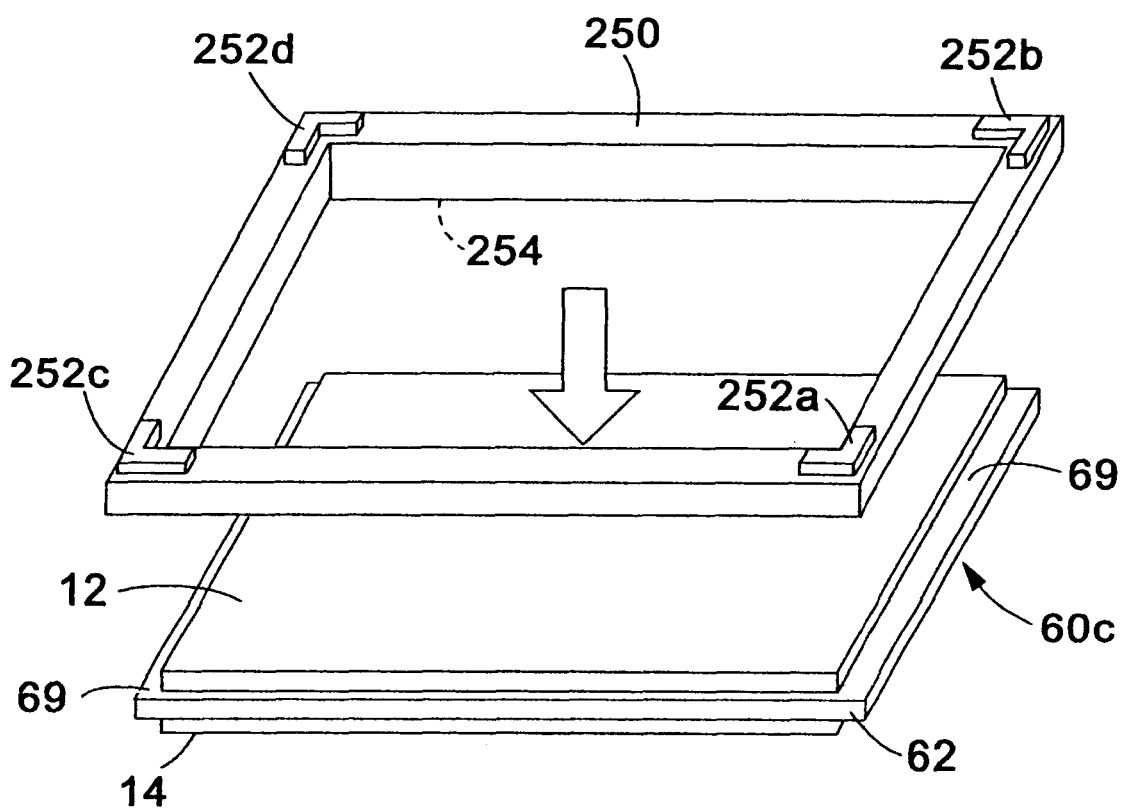
FIG. 16 is a diagram schematically showing the flat fluorescent lamp of FIG. 12(C) and another lamp (parts) holder.

FIG. 16 is a diagram separately showing in perspective another lamp holder 250 and the flat fluorescent lamp 60c of FIG. 12(C). The holder 250 corresponds to the holder 202 of FIG. 11, and the holder 250 and the lamp 60c are incorporated into an LCD device such as denoted by 200 (FIG. 10) wherein the rear frame 44 is deformed such as to directly support the bottom of each of the holder 250 and the protrusion 69.

Figure 17:
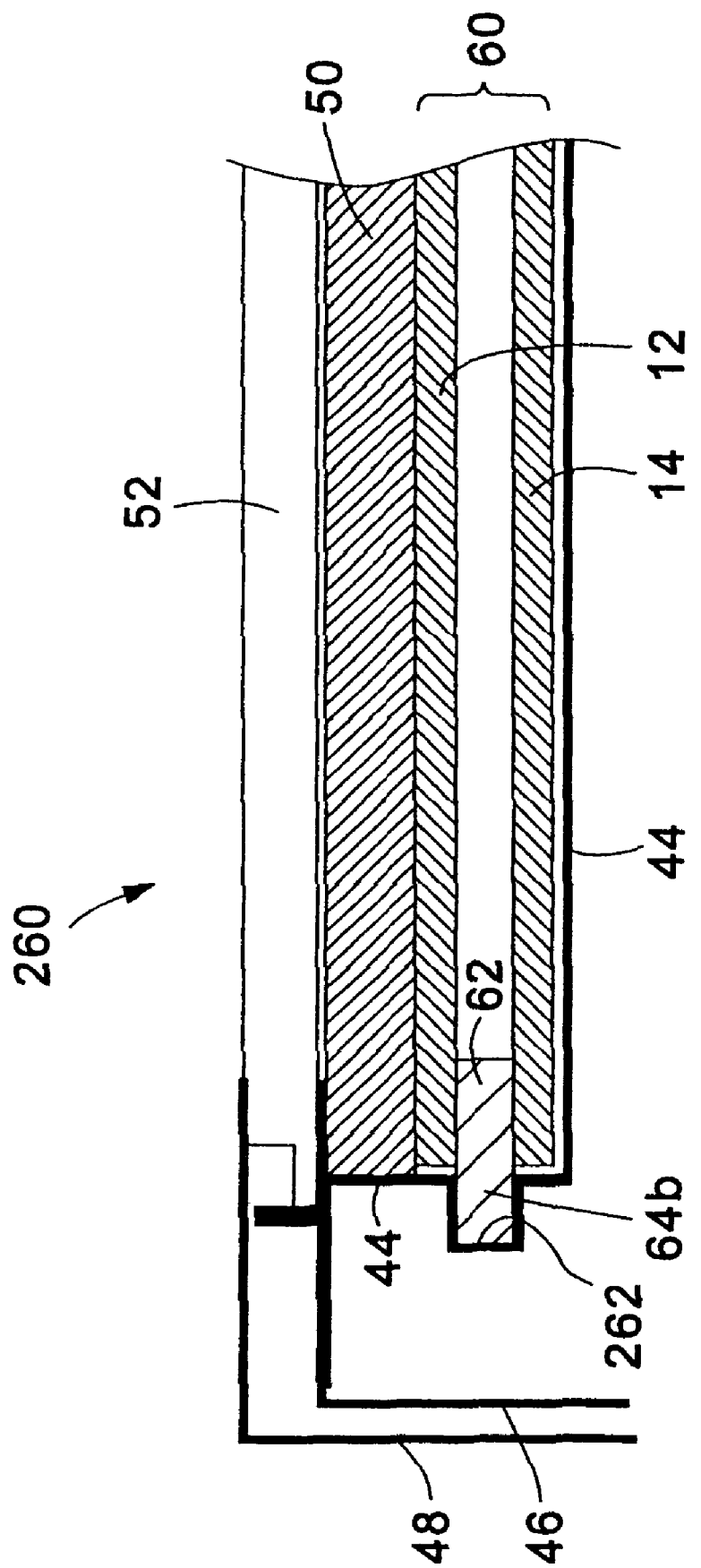
FIG. 17 is a partial sectional view of an LCD device wherein a flat fluorescent lamp embodying the present invention is held such as to be different from the preceding manner of holdings.

FIG. 17 is a partial sectional view of an LCD device 260 wherein the flat fluorescent lamp 60 of FIG. 4 is incorporated, and the protrusions 64b is held by a recession 262 which is formed by bending and shaping the rear frame 44. The protrusions 64a and 64a–64d are also able to be held in exactly the same manner. It is understood that the other type protrusions such as shown in FIGS. 12(A)–12(B) can be held with slight modifications of the recession 262.

The foregoing descriptions show one preferred embodiment and some modifications thereof. However, other various modifications are apparent to those skilled in the art without departing from the scope of the present invention which is only limited by the appended claims. Therefore, the embodiments and modification shown and described are only illustrated, not restrictive.

What is claimed is:

1. A flat fluorescent lamp comprising:
   a sealed chamber formed by a chamber frame and first and second glass plates, which glass plates are bonded to opposite sides of said chamber frame in alignment with the edges thereof;
   a phosphor coating provided on an inner surface of said first glass plate; and
   a plurality of electrodes provided on an inner surface of said second glass plate for inducing electric discharge within said chamber;
   wherein said chamber frame is provided with mating means via which said flat fluorescent lamp is held within a lamp holding frame, said mating means protruding from said chamber frame in parallel with said two glass plates beyond the edges of said two glass plates such as to leave space between the edges of said glass plates and said lamp holding frame.

2. The flat fluorescent lamp as claimed in claim 1, wherein said mating means comprises a plurality of projections extending from two opposite sides of said chamber frame.

3. The flat fluorescent lamp as claimed in claim 1, wherein said mating means comprises two projections respectively extending entirely from two opposite sides of said chamber frame.

4. The flat fluorescent lamp as claimed in claim 1, wherein said mating means comprises projections extending from whole circumference of said chamber frame.

5. The flat fluorescent lamp as claimed in claim 1, wherein said chamber frame carries a phosphor coating or a light reflecting film at the inner side thereof.

6. The flat fluorescent lamp as claimed in claim 1, wherein said lamp holding frame is provided with recesses for receiving said mating means so as to hold said flat fluorescent lamp.

7. The flat fluorescent lamp as claimed in claim 1, wherein said lamp holding frame comprises two members each of which is provided with at least one groove, said grooves of said two members are assembled so as to form recesses for receiving said mating means in order to hold said flat fluorescent lamp.

8. A liquid crystal display device, comprising:
   a liquid crystal display panel;
   a flat fluorescent lamp for emitting light therefrom, said flat fluorescent lamp positioned so as to illuminate said liquid crystal display panel from behind, said flat fluorescent lamp comprising a sealed chamber formed by a chamber frame and first and second glass plates, which glass plates are bonded to opposite sides of said chamber frame in alignment with the edges thereof; and
   a light diffusion plate provided between said flat fluorescent lamp and said liquid crystal display panel,
   wherein said chamber frame is provided with mating means via which said flat fluorescent lamp is held within a lamp holding frame, said mating means protruding from said chamber frame in parallel with said two glass plates beyond the edges of said two glass plates such as to leave space between the edges of said glass plates and said lamp holding frame.

9. The liquid crystal display device as claimed in claim 8, wherein said mating means comprises a plurality of projections extending entirely from two opposite sidewalls of said chamber frame.

10. The liquid crystal display device as claimed in claim 8, wherein said mating means comprises two projections respectively extending from two opposite entire sides of said frame.

11. The liquid crystal display device as claimed in claim 8, wherein said mating means comprises projections extending from whole circumference of said chamber frame.

12. The liquid crystal display device as claimed in claim 8, wherein said chamber frame carries a phosphor coating or a light reflecting film at the inner side thereof.

13. The liquid crystal display device as claimed in claim 8, wherein said lamp holding frame is provided with recesses for receiving said mating means so as to hold said flat fluorescent lamp.

14. The liquid crystal display device as claimed in claim 8, wherein said lamp holding frame comprises two members each of which is provided with at least one groove, said grooves of said two members are assembled so as to form recesses for receiving said mating means in order to hold said flat fluorescent lamp.

* * * * *

UNITED STATES PATENT AND TRADEMARK OFFICE
CERTIFICATE OF CORRECTION

PATENT NO. : 6,611,092 B2
DATED : August 26, 2003
INVENTOR(S) : Fujishiro

It is certified that error appears in the above-identified patent and that said Letters Patent is hereby corrected as shown below:

<u>Title page,</u>
Item [30], Foreign Application Priority Data, should be added as
-- October 6, 2000 [JP] ……….. 2000-308171 --.

Signed and Sealed this

Twenty-third Day of March, 2004

JON W. DUDAS
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 6,611,092 B2 | Page 1 of 1 |
| APPLICATION NO. | : 09/971994 | |
| DATED | : August 26, 2003 | |
| INVENTOR(S) | : Fumihiko Fujishiro | |

It is certified that error appears in the above-identified patent and that said Letters Patent is hereby corrected as shown below:

Under REFERENCES CITED at (56):

Add the following references:
JP01-152491
JP10-123514

Signed and Sealed this
Twenty-sixth Day of July, 2011

David J. Kappos
*Director of the United States Patent and Trademark Office*